United States Patent [19]

Inamura

[11] Patent Number: 5,149,110

[45] Date of Patent: Sep. 22, 1992

[54] METAL GASKET WITH FLUID HOLE SEALING SEVICES

[75] Inventor: Susumu Inamura, Tokyo, Japan

[73] Assignee: Ishikawa Gasket Co., Ltd., Tokyo, Japan

[21] Appl. No.: 712,894

[22] Filed: Jun. 12, 1991

[30] Foreign Application Priority Data

Jul. 11, 1990 [JP] Japan .................. 2-73596[U]
Aug. 7, 1990 [JP] Japan .................. 2-83093[U]

[51] Int. Cl.$^5$ ............................. F16J 15/08
[52] U.S. Cl. ....................... 277/235 B; 277/233; 277/234; 277/236
[58] Field of Search ............ 277/207 R, 208, 209, 277/233, 234, 235 B, 235 R, 236

[56] References Cited

U.S. PATENT DOCUMENTS

| 4,480,844 | 11/1984 | Kozerski | 277/235 B |
| 4,721,315 | 1/1988 | Ueta | 277/235 B |
| 4,759,556 | 7/1988 | Udagawa | 277/235 B |
| 4,915,398 | 4/1990 | Kitagawa | 277/236 X |
| 4,948,153 | 8/1990 | Takahashi et al. | 277/236 X |
| 4,971,338 | 11/1990 | Udagawa | 277/235 B X |
| 5,004,250 | 4/1991 | Udagawa | 277/235 B X |
| 5,022,664 | 6/1991 | Kitada et al. | 277/235 B X |

FOREIGN PATENT DOCUMENTS

| 0158956 | 6/1953 | Australia | 277/235 B |
| 0580795 | 8/1956 | Canada | 277/235 B |
| 0160549 | 7/1986 | Japan | 277/235 B |
| 0255250 | 11/1986 | Japan | 277/235 B |
| 0954327 | 4/1964 | United Kingdom | 277/235 B |
| 2040007 | 8/1980 | United Kingdom | 277/235 B |

Primary Examiner—William A. Cuchlinski, Jr.
Assistant Examiner—James Folker
Attorney, Agent, or Firm—Kanesaka and Takeuchi

[57] ABSTRACT

The metal gasket of the invention is installed in an internal combustion engine. The engine includes a plurality of cylinder bores and bolt holes, and at least first and second fluid holes. The first fluid hole is located in an area surrounded by imaginary lines linking between the centers of the bolt holes along the outer periphery of the gasket, and the second fluid hole is located outside the area surrounded by the imaginary lines. The gasket is basically formed of a first metal plate and includes a plurality of holes corresponding to the cylinder bores, bolt holes and first and second fluid holes. The first metal plate includes a first bead around the first fluid hole, and a second bead around the second fluid hole. The height of the second bead may be less than the height of the first bead. The second bead may have a spring constant less than that of the first bead. Therefore, when the gasket is tightened, the first bead is sufficiently compressed to seal around the same. Other metal plates may be laminated with the first metal plate to form a steel laminate gasket. The first and second beads may be formed on the different plates.

9 Claims, 2 Drawing Sheets

METAL GASKET WITH FLUID HOLE SEALING SEVICES

BACKGROUND OF THE INVENTION AND RELATED ARET STATEMENT

The present invention relates to a metal gasket with fluid hole sealing devices, to which different tightening pressure is applied when a gasket is tightened.

In an internal combustion engine, there are provided with many holes, such as cylinder bores, water holes, oil holes, push rod holes, bolt holes and so on. In these holes, a large combustion force or pressure is created at the cylinder bores, while a moderate force or pressure is applied to the water holes and other holes.

Since the large combustion force is created at the cylinder bores, the bolt holes are arranged to effectively seal around the cylinder bores. The other holes are arranged properly around the cylinder bores. Therefore, areas around the cylinder bores are relatively equally pressurized by the bolts to securely seal around the cylinder bores when the gasket is tightened. However, areas around the other holes are not equally pressurized when the gasket is tightened.

In a cylinder head gasket, in order to provide strong surface pressure around the cylinder bores when a gasket is tightened, in case beads are formed around the cylinder bores, strong beads are formed around the cylinder bores. Also, the areas around the cylinder bores may be made thicker than areas outside thereof to provide high compression pressure thereat.

Therefore, when the gasket is installed in the engine and is tightened by the bolts, the cylinder head may be curved such that portions corresponding to the cylinder bores slightly extend outwardly or upwardly. Therefore, equal surface pressure is not formed at, especially, an area around a water hole near the cylinder bore when the gasket is tightened.

In addition, when an engine is operated, the engine vibrates and is heated at high temperature. Accordingly, it is liable to leak from other holes.

In view of these problems, there have been proposed many methods. For example, in case a gasket is provided with a bead around a hole to be sealed, a pressure regulation plate or portion is formed adjacent to the bead so that the bead is not completely compressed when the gasket is tightened to thereby prevent creep relaxation of the bead.

In U.S. Pat. No. 4,759,556, a portion away from the bolt is generally weak in surface pressure when the gasket is tightened, so that one bead is separated into two beads at the portion away from the bolt to provide strong surface pressure thereat when the gasket is tightened.

In the prior art, strength of a bead is partly changed to seal properly against different tightening pressure applied to the bead. However, sealing around fluid holes other than the cylinder bores is not considered with reference to local surface pressure applied to the cylinder head.

Accordingly, one object of the present invention is to provide a metal gasket with fluid hole sealing devices, which can seal properly around the fluid holes with reference to local surface pressure applied to a gasket.

Another object of the invention is to provide a metal gasket as stated above, which can effectively seal around the fluid holes for a long period of time.

A further object of the invention is to provide a metal gasket as stated above, which can be easily and economically manufactured.

Further objects and advantages of the invention will be apparent from the following description of the invention.

SUMMARY OF THE INVENTION

A metal gasket with fluid hole sealing devices of the present invention is installed in an internal combustion engine. The engine includes a plurality of cylinder bores and bolt holes, and at least first and second fluid holes. The first fluid hole is located in an area surrounded by imaginary lines linking between centers of the bolt holes along an outer periphery of the gasket. The second fluid hole is located outside the area surrounded by the imaginary lines.

The metal plate is basically formed of a first metal plate. The first metal plate extends substantially throughout the entire area of the engine and includes a plurality of holes corresponding to the cylinder bores, bolt holes and first and second fluid holes. Also, cylinder bore sealing devices are formed around the cylinder bores.

The first metal plate is provided with a first bead around the first fluid hole, and a second bead around the second fluid hole. The height of the second bead is less than the height of the first bead. Therefore, when the gasket is tightened, the first bead is sufficiently compressed to seal around the same.

Namely, the first bead is located in the area surrounded by the imaginary lines or adjacent the cylinder bores. Therefore, the cylinder head is liable to project or lift up outwardly when the gasket is tightened, and also, high tightening pressure is applied to that area.

In view of this matter, the height of the first bead is made higher than the second bead located outside the area surrounded by the imaginary lines. Therefore, when the gasket is tightened, the first bead is sufficiently compressed to seal around the fluid hole.

Instead of forming the first and second beads as stated above, the first and second beads may be formed such that the first bead has a spring constant higher than that of the second bead.

The area surrounded by the imaginary lines receives high tightening pressure. Also, temperature becomes especially high at the area when the engine is operated. Therefore, the spring constant of the first bead is made higher than that of the second bead. As a result, the first bead is securely sealed.

It is possible to form the first bead greater than the second bead in height and spring constant.

When comparing the first bead with a bead for sealing around the cylinder bore, the bead around the cylinder bore is shorter than the first bead in height and stronger than the first bead in spring constant.

When the metal gasket is formed of a plurality of plates, the first and second beads, and the bead for the cylinder bore may be formed on the same plate or formed on different plates. The thickness of the plates may be changed to change the spring constant of the beads.

DETAILED DESCRIPTION OF PREFERRED EMBODIMENTS

Figure 1:
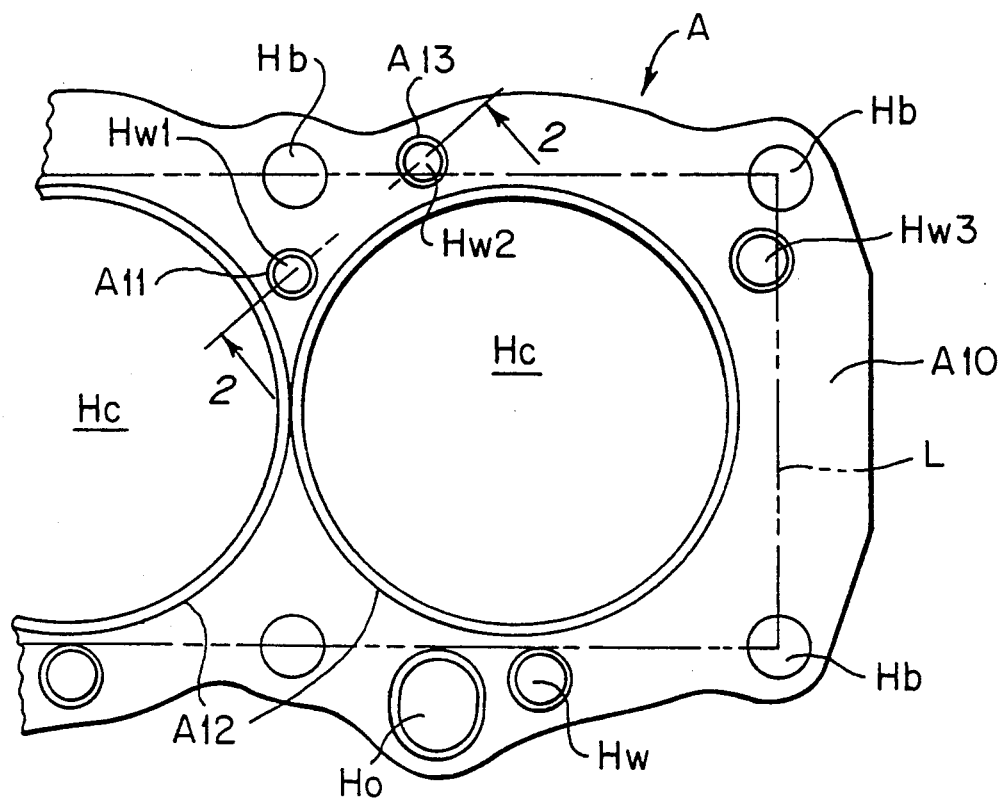
FIG. 1 is a plan view of a part of a metal gasket of a first embodiment of the invention.
Figure 2:
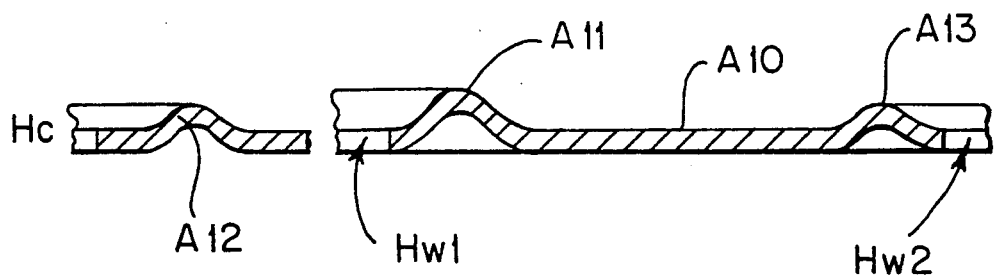
FIG. 2 is an enlarged section view taken along a line 2—2 in FIG. 1.

Referring to FIGS. 1 and 2, a first embodiment A of a metal gasket of the invention is shown. The metal gasket A is a cylinder head gasket and is formed of one metal plate A10.

The metal gasket A includes a plurality of holes for cylinder bores Hc, water holes Hw, Hw1, Hw2, Hw3, bolt holes Hb and an oil hole Ho. The bolt holes Hb are arranged around the cylinder bores Hc to provide tightening pressure around the cylinder bore Hc as equal as possible.

When imaginary lines L linking between centers of the bolt holes Hb along the outer periphery of the gasket A are drawn, the water holes Hw, Hw2 are located outside the imaginary lines L. The water holes Hw1, Hw3 are located substantially inside the imaginary lines L. Namely, substantial portion or more than half of the water hole Hw3 is located inside the imaginary lines L.

When the gasket A is tightened, an area inside the imaginary lines is slightly lifted up or curved upwardly, and an area outside the imaginary lines is slightly pushed downwardly. Also, strong tightening pressure is applied to the area inside the imaginary lines L. Therefore, even if the cylinder head is equally tightened, equal surface pressure is not formed on the gasket A.

In the gasket A, the water hole Hw1 is located inside the imaginary lines L, while the water hole Hw2 is located outside the imaginary lines L. Accordingly, a bead A11 around the water hole Hw1 is formed according to the present invention.

As shown in FIG. 2, beads A12 are formed around the cylinder bore Hc to seal therearound. The bead A11 is formed around the water hole Hw1, while a bead A13 is formed around the water hole Hw2.

Since the bead A11 is located inside the imaginary lines L, to which strong tightening pressure is applied, the height of the bead A11 is made higher than that of the bead A13. The width of the bead A11 is the same as that of the bead A13.

When the gasket A is tightened, the bead A11 is compressed first. Since the bead A11 is higher than the bead A13, the bead A11 can provide spring force greater than that of the bead A13. The water hole Hw1 is, therefore, effectively sealed.

The height of the bead A12 around the cylinder bore Hc is lower than that of the bead A11. However, in order to provide high surface pressure by the bead A12, the bead A12 has the width shorter than that of the bead A11. Therefore, when the gasket is tightened, the bead A12 can provide surface pressure stronger than the bead A11.

In the gasket A, when the gasket is tightened, high tightening pressure is applied inside the imaginary lines L. Therefore, the bead A11 may have spring constant stronger than the bead A13 instead of the tall bead. The bead A11 may have height and spring constant greater than those of the bead A13.

Spring constant may be changed by changing height, width or curvature of a bead. Generally, if height is made lower, width is made wider or curvature is made moderate, spring constant becomes small, i.e. a bead can be compressed at relatively lower tightening pressure.

When the gasket A is compressed, all the holes are well sealed by the beads.

Figure 3:
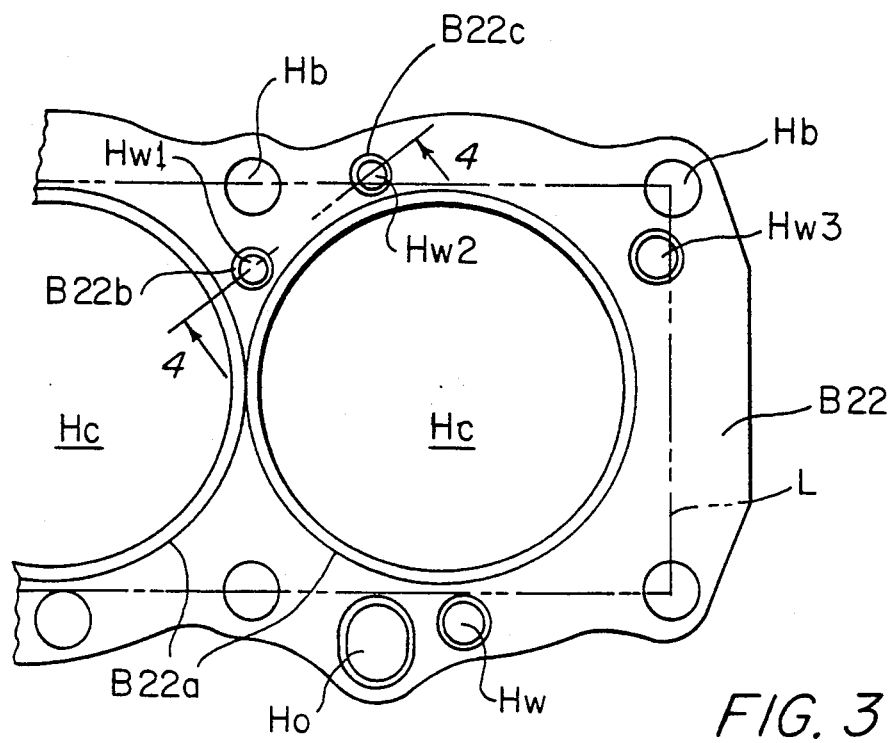
FIG. 3 is a plan view of a part of a metal gasket of a second embodiment of the invention.
Figure 4:
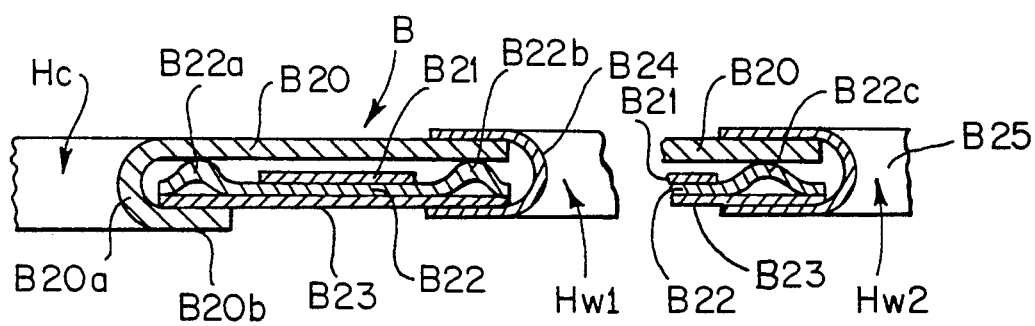
FIG. 4 is an enlarged section view taken along a line 4—4 in FIG. 3.

FIGS. 3 and 4 show a second embodiment B of a metal gasket of the invention. The gasket B is a cylinder head gasket and includes a plurality of holes for the cylinder bores Hc, water holes Hw, Hw1–Hw3, an oil hole Ho and bolt holes Hb, as in the gasket A.

The gasket B comprises an upper plate B20, middle plates B21, B22, and a lower plate B23. The upper plate B20 is provided with a curved portion B20a around the cylinder bore Hc, and a flange B20b under the lower plate B23.

The middle plate B22 has beads B22a, B22b, B22c around the cylinder bore Hc and water holes Hw1, Hw2, respectively. The beads B22a, B22b have the same width, but the bead B22c has the width wider than the beads B22a, B22b. The height of the beads B22a, B22b, B22c are the same. Therefore, the bead B22b around the water hole Hw1 has spring constant higher than that of the bead B22c.

The middle plate B21 is situated between the upper plate B20 and the middle plate B22 without overlapping the beads B22a, B22b, B22c. The lower plate B23 is situated under the middle plate B22. Also, a grommet B24 is provided around the water hole Hw1, and a grommet B25 is provided around the water hole Hw2.

When the gasket B is tightened, since the spring constant of the bead B22b is greater than that of the bead B22c, the bead B22b provides surface pressure stronger than the bead B22c. Therefore, even if the gasket B is slightly curved upwardly inside the imaginary lines L when the gasket is tightened, the area around the water hole Hw1 is securely sealed.

Figure 5:
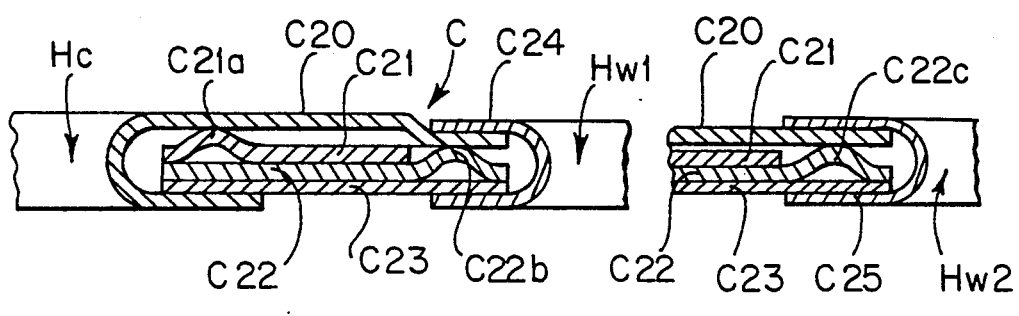
FIG. 5 is an enlarged section view, similar to FIG. 4, for showing a third embodiment of the metal gasket of the invention.

FIG. 5 shows a third embodiment C of a metal gasket of the invention. The gasket C comprises an upper plate C20, middle plates C21, C22, a lower plate C23, and grommets C24, C25, as in the gasket B.

However, the middle plate C21 is provided with a bead C21a around the cylinder bore Hc, and the middle plate C22 is provided with a bead C22b around the water hole Hw1 and a bead C22c around the water hole Hw2. The heights of the bead C22b, C22c are the same, but the width of the bead C22b is shorter than the width of the bead C22c. Spring constant at the bead C22b is greater than that of the bead C22c.

The size of the bead C21a is substantially the same as the size of the bead C22b, but the plate C21 is made of a material harder than the plate C22. Therefore, when the gasket C is tightened, the bead C21a provides surface pressure stronger than the beads C22b, C22c, while the surface pressure at the bead C22b is stronger than that at the bead C22c. Therefore, when the gasket C is tightened, the beads C21a, C22b, C22c seal around the holes effectively and properly.

In the present invention, a bead located at an area where high tightening pressure is applied or a cylinder head is curved outwardly when the gasket is tightened is made higher in height or stronger in spring constant than a bead outside that area. Therefore, when the gasket is tightened, the bead at that area can be sealed effectively.

While the invention has been explained with reference to the specific embodiments of the invention, the explanation is illustrative, and the invention is limited only by the appended claims.

What is claimed is:

1. A metal gasket for an internal combustion engine having a plurality of cylinder bores and bolt holes, and at least first and second fluid holes, said first fluid hole being located within an area surrounded by an imaginary line linking centers of the bolt holes along an outer periphery of the gasket, and said second fluid hole being located outside the area surrounded by the imaginary line, said gasket comprising:

a first metal plate extending substantially throughout an entire area of the engine and including a plurality of holes corresponding to the cylinder bores, bolt holes and first and second fluid holes, a first bead formed on the first metal plate around the first fluid hole for sealing around the same, and a second bead formed on the first metal plate around the second fluid hole, said first bead having spring constant higher than that of the second bead so that when the gasket is tightened, the first bead is sufficiently compressed to seal around the first bead.

2. A metal gasket according to claim 1, further comprising cylinder bore sealing devices situated around the cylinder bores to seal around the same when the gasket is tightened.

3. A metal gasket according to claim 2, wherein said cylinder bore sealing devices are beads integrally formed with the first metal plate, each cylinder bore sealing device having spring constant greater than spring constant of the first bead.

4. A metal gasket according to claim 3, wherein the first bead is higher in height than the beads for the cylinder bore sealing devices.

5. A metal gasket according to claim 4, further comprising a second metal plate piling over the first metal plate to constitute a steel laminate gasket.

6. A metal gasket according to claim 1, wherein said first bead has a height higher than that of the second bead.

7. A metal gasket for an internal combustion engine having a plurality of cylinder bores and bolt holes, and at least first and second fluid holes, said first fluid hole being located within an area surrounded by an imaginary line linking centers of the bolt holes along an outer periphery of the gasket, and said second fluid hole being located outside the area surrounded by the imaginary line, said gasket comprising:

a plurality of metal plates for constituting a steel laminate gasket, said metal plates including a plurality of holes corresponding to the cylinder bores, bolt holes and first and second fluid holes, cylinder bore sealing devices situated around the cylinder bores for sealing around the same, a first bead formed on one of the metal plates around the first fluid hole for sealing around the same, and a second bead formed on one of the metal plates around the second fluid hole for sealing around the same, said second bead having spring constant less than that of the first bead so that when the gasket is tightened, the first bead is sufficiently compressed to seal around the same.

8. A metal gasket according to claim 7, wherein said cylinder bore sealing devices are beads and are formed on a plate different from a plate that said first and second beads are formed to provide different surface pressure at the beads.

9. A metal gasket according to claim 7, wherein said cylinder bore sealing devices are beads formed on the plate that the first and second beads are formed.

* * * * *